United States Patent
Haghighat et al.

(10) Patent No.: US 7,293,265 B2
(45) Date of Patent: Nov. 6, 2007

(54) METHODS AND APPARATUS TO PERFORM RETURN-ADDRESS PREDICTION

(75) Inventors: Mohammad R. Haghighat, San Jose, CA (US); David C. Sehr, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 10/438,608

(22) Filed: May 15, 2003

(65) Prior Publication Data

US 2004/0230779 A1  Nov. 18, 2004

(51) Int. Cl.
G06F 9/45 (2006.01)
G06F 9/44 (2006.01)

(52) U.S. Cl. ................ 717/157; 717/151; 712/239

(58) Field of Classification Search ............... None
See application file for complete search history.

(56) References Cited

U.S. PATENT DOCUMENTS

| | | | | |
|---|---|---|---|---|
| 5,522,072 A | * | 5/1996 | De Bruler | 712/220 |
| 5,887,159 A | * | 3/1999 | Burrows | 712/226 |
| 6,023,582 A | * | 2/2000 | Rogers et al. | 717/162 |
| 6,823,447 B2 | * | 11/2004 | Hay et al. | 712/239 |
| 2002/0112227 A1 | * | 8/2002 | Kramskoy et al. | 717/148 |
| 2004/0083460 A1 | * | 4/2004 | Pierce | 717/131 |
| 2005/0080760 A1 | | 4/2005 | Haghighat et al. | |
| 2006/0047681 A1 | | 3/2006 | Ghiya et al. | |

OTHER PUBLICATIONS

Skadron et al., "Improving Prediction for Procedure Returns with Return-Address-Stack Repair Mechanisms", Nov. 1998, pp. 259-267, IEEE, International Symposium on Microarchitecture.*
Taura et al., "Fine-grain Multithreading with Minimal Compiler Support-A Cost Effective Approach to Implementing Efficient Multithreading Languages", May 1997, ACM SIGPLAN Notices, vol. 32, Issue 5, pp. 320-333, http://delivery.acm.org/10.1145/260000/258944/p320-taura.pdf?key1=258944&key2=6580200811&coll=GUIDE&dl=GUIDE&CFID=19535324&CFTOKEN=455666.*
David R. Kaeli and Philip G. Emma. *Improving the Accuracy of History-Based Branch Predicition*, 46 IEEE Transactions on Computers 469 (1997).
David R. Kaeli and Philip G. Emma, *Branch History Table Prediction of Moving Target Branches Due to Subroutince Returns*, IEEE Symposium on Computer Architecture 34 (1991).
Kevin Skadron et al., *Improving Prediction for Procedure Returns with Return-Address-Stack Repair Mechanisms*, IEEE International Symposium on Microarchitecture 259 (1998).
Steven S. Muchnick, Advanced Compiler Design Implementation, Morgan Kaufmann Publishers, 1997, pp. 169-172.

* cited by examiner

*Primary Examiner*—Wei Y. Zhen
*Assistant Examiner*—Chih-Ching Chow
(74) *Attorney, Agent, or Firm*—Hanley, Flight & Zimmerman, LLC

(57) ABSTRACT

Methods and apparatus to perform return-address prediction in a program are described herein. In an example method, a procedure associated with an overflow condition is detected. A branch-hint instruction corresponding to a return instruction associated with the procedure is inserted into the program.

50 Claims, 8 Drawing Sheets

300

400

400

800

900

METHODS AND APPARATUS TO PERFORM RETURN-ADDRESS PREDICTION

TECHNICAL FIELD

The present disclosure relates generally to processor systems, and more particularly, to methods and apparatus to perform return-address prediction.

BACKGROUND

Branch prediction enables a processor to begin executing instructions before a branch outcome is certain. That is, previous history and/or patterns are used to predict an outcome of a branch. Typically when a procedure branches to another procedure, a call instruction (e.g., either a jump-and-link or jump-and-link-register instructions) may push a return address into a return-address stack. The return-address stack is a data area or buffer used to store return addresses that need to be handled. In particular, the return-address stack is a push-down list such that old return addresses are pushed down as new return addresses come in. When a return instruction in a procedure is executed, a return address may pop up from the return-address stack. In a last-in, first-out (LIFO) approach, a processor may take its next return address from the top of the return-address stack. Based on the popped-up return address, the processor may predict the target of the next instruction to execute.

The size of the return-address stack, however, may be limited because of cost associated with implementing the return-address stack on an integrated circuit. This is problematic for applications with a large number of call chains (i.e., procedures that call other procedures). When the return-address stack is full, a stack push operation initiated by an additional call instruction may cause the return-address stack to overflow. Especially for procedures that simply call other procedures, the processor loses its prior knowledge of the return address associated with the executed call instruction (i.e., overwriting the oldest entry of return addresses in the stack). As a result, the target of a number of return instructions may be mispredicted.

DETAILED DESCRIPTION

Although the following discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

Figure 1:
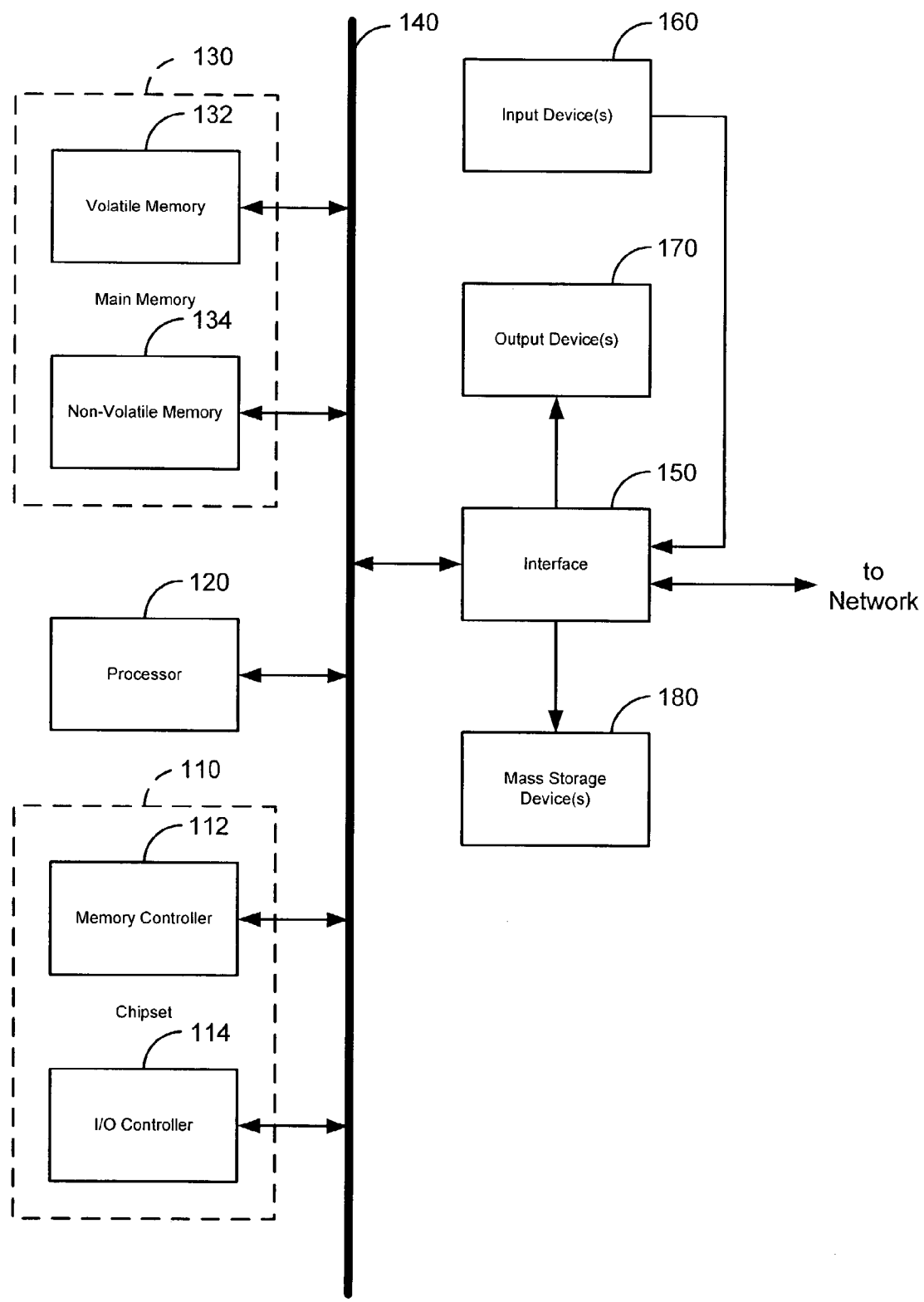
FIG. 1 is a block diagram representation of an example processor system.

FIG. 1 is a block diagram of an example processor system 100 adapted to implement the methods and apparatus disclosed herein. The processor system 100 may be a desktop computer, a laptop computer, a notebook computer, a personal digital assistant (PDA), a server, an Internet appliance, or any other type of computing device.

The processor system 100 illustrated in FIG. 1 includes a chipset 110, which includes a memory controller 112 and an input/output (I/O) controller 114. As is well known, a chipset typically provides memory and I/O management functions as well as a plurality of general purpose and/or special purpose registers, timers, etc. that are accessible or used by a processor 120. The processor 120 is implemented by one or more in-order processors. For example, the processor 120 may be implemented by one or more of the Intel® Pentium® family of microprocessors, the Intel® Itanium® family of microprocessors, Intel® Centrino® family of microprocessors, and/or the Intel XScale® family of processors. Other processors from other families are also appropriate.

As is conventional, the memory controller 112 performs functions that enable the processor 120 to access and communicate with a main memory 130 including a volatile memory 132 and a non-volatile memory 134 via a bus 140. The volatile memory 132 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 134 may be implemented by flash memory, Read Only Memory (ROM), Electrically Erasable Programmable Read Only Memory (EEPROM), and/or any other desired type of memory device.

The processor system 100 also includes a conventional interface circuit 150. The interface circuit 150 may be implemented by any type of well known interface standard such as an Ethernet interface, a universal serial bus (USB), a third generation input/output interface (3GIO) interface, and/or any other suitable type of interface.

One or more input devices 160 are connected to the interface circuit 150. The input device(s) 160 permit a user to enter data and commands into the processor 120. For example, the input device(s) 160 may be implemented by a keyboard, a mouse, a touch-sensitive display, a track pad, a track ball, an isopoint, and/or a voice recognition system.

One or more output devices 170 are also connected to the interface circuit 150. For example, the output device(s) 170 may be implemented by display devices (e.g., a light emitting display (LED), a liquid crystal display (LCD), a cathode ray tube (CRT) display, a printer and/or speakers). The interface circuit 150, thus, typically includes a graphics driver card.

The processor system 100 also includes one or more mass storage devices 180 configured to store software and data. Examples of such mass storage device(s) 180 include floppy disk drives, hard disk drives, compact disk drives, and digital versatile disk (DVD) drives.

The interface circuit 150 also includes a communication device such as a modem or a network interface card to facilitate exchange of data with external computers via a network. The communication link between the processor system 100 and the network may be any type of network connection such as an Ethernet connection, a digital subscriber line (DSL), a telephone line, a cellular telephone system, a coaxial cable, etc.

Access to the input device(s) 160, the output device(s) 170, the mass storage device(s) 180 and/or the network is typically controlled by the I/O controller 114 in a conventional manner. In particular, the I/O controller 114 performs functions that enable the processor 120 to communicate with the input device(s) 160, the output device(s) 170, the mass storage device(s) 180 and/or the network via the bus 140 and the interface circuit 150.

While the components shown in FIG. 1 are depicted as separate functional blocks within the processor system 100, the functions performed by some of these blocks may be integrated within a single semiconductor circuit or may be implemented using two or more separate integrated circuits. For example, although the memory controller 112 and the I/O controller 114 are depicted as separate functional blocks within the chipset 110, persons of ordinary skill in the art will readily appreciate that the memory controller 112 and the I/O controller 114 may be integrated within a single semiconductor circuit.

Figure 2:
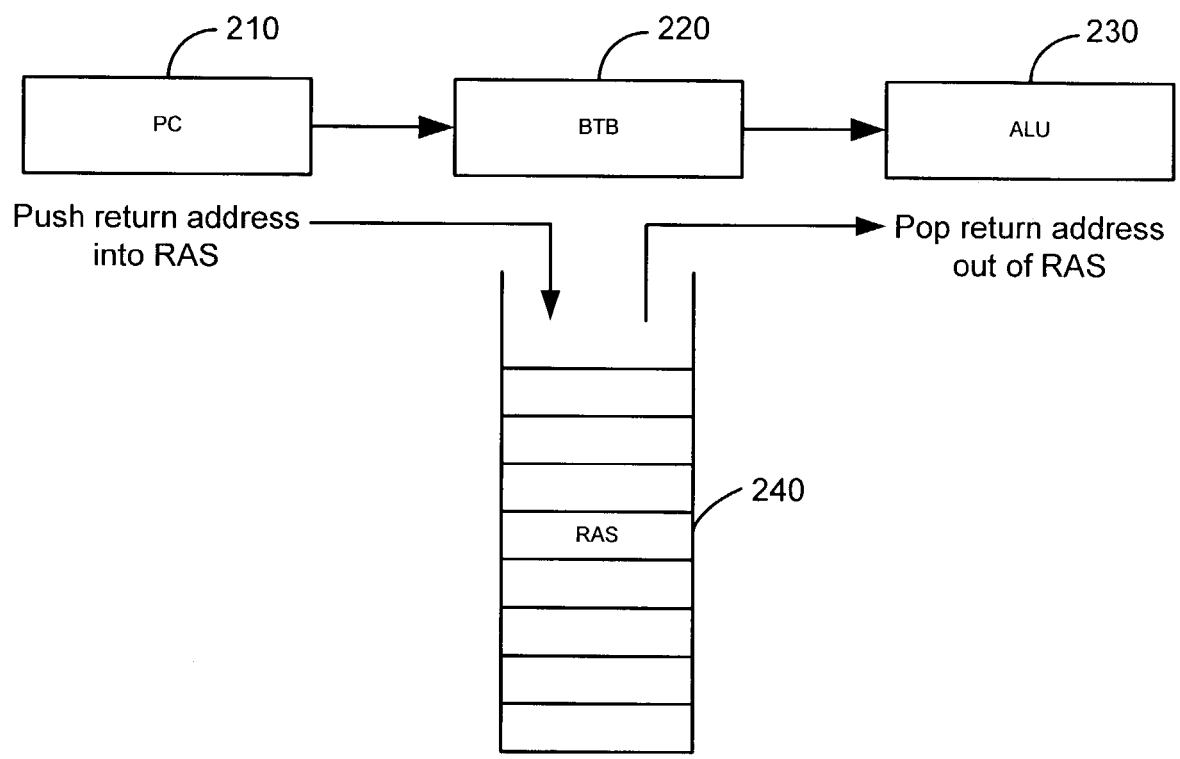
FIG. 2 is a block diagram representation of an example processor.

In the example of FIG. 2, the illustrated processor 120 includes a program counter (PC) 210, a branch target buffer (BTB) 220, an arithmetic and logic unit (ALU) 230, and a return-address stack (RAS) 240. The program counter 210 is a register configured to contain address of instructions to be executed by the arithmetic and logic unit 230. The program counter 210 automatically increments after each instruction is fetched to point to the address of the next instruction. The branch target buffer 220 is a register configured to store a predicted location (i.e., a target) of a branch instruction to a procedure. A branch instruction may specify where to go to find the next instruction. The return-address stack 240 is a data structure configured to store a number of entries such as return addresses.

An example stack operation performed by the processor 120 shown in FIG. 2 starts with loading an address of an instruction in a procedure into the program counter 210. When a call instruction (i.e., a branch instruction to invoke another procedure) is executed, the address of the call instruction and that of the next instruction executed (i.e., an instruction in the invoked procedure) are stored in the branch target buffer 220. Further, a return address corresponding to the return instruction in the invoked procedure is pushed into the return-address stack 240. In a last-in, first-out (LIFO) approach, the return-address stack 240 pushes down old entries as new entries come in. As a result, a newer entry pops up from the return-address stack 240 before an older entry. When a return instruction of the procedure is executed, a return address pops up from the top of the return-address stack 240. The return address is then stored in the branch target buffer 220 as the location of the next instruction to be executed by the arithmetic and logic unit 230.

Figure 3:
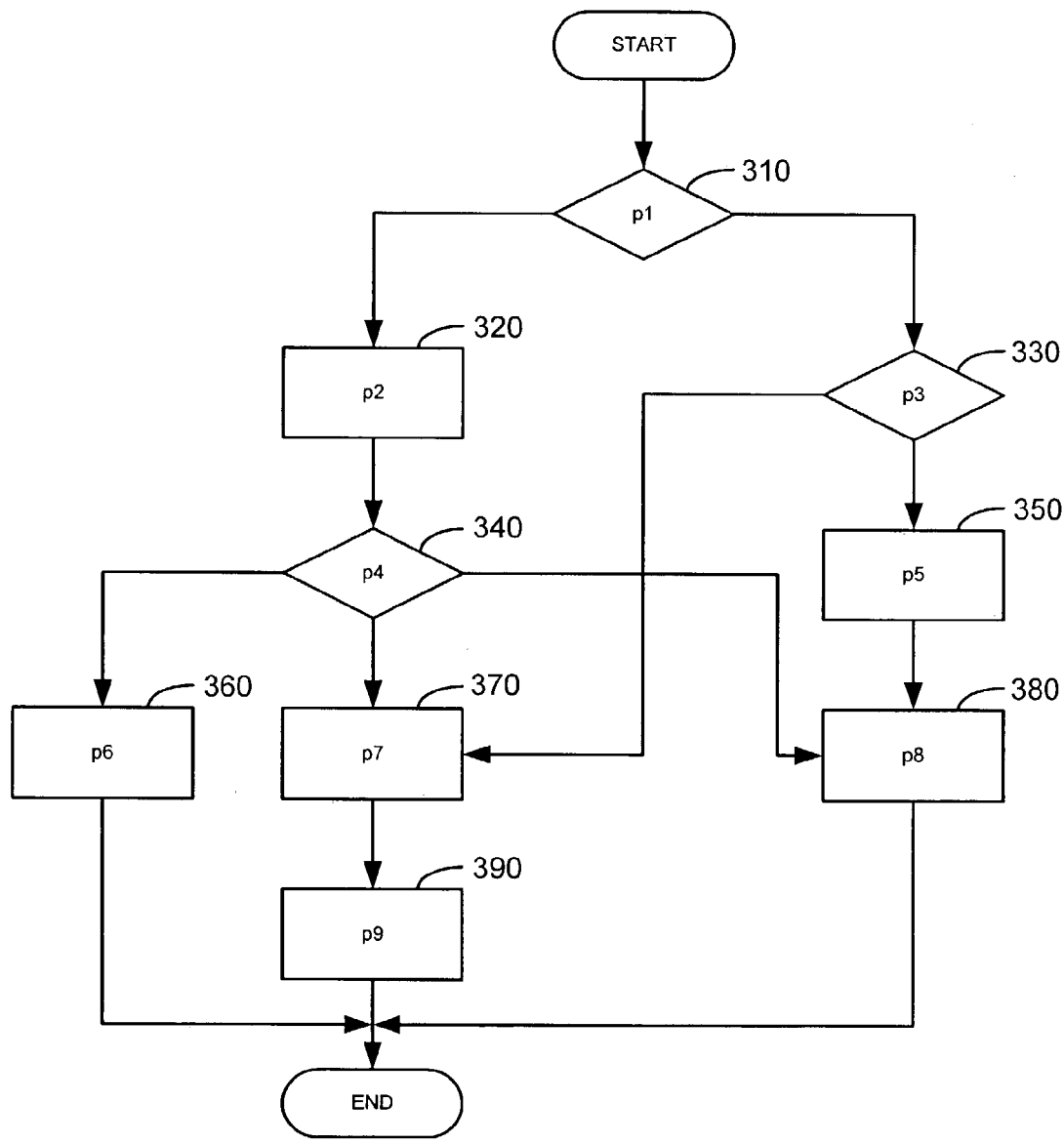
FIG. 3 is a flow diagram representation of an example control flow for an application.

In the example of FIG. 3, the control flow of an application 300 includes a plurality of procedures, generally shown as (p1) 310, (p2) 320, (p3) 330, (p4) 340, (p5) 350, (p6) 360, (p7) 370, (p8) 380, and (p9) 390. In particular, procedure (p1) 310 may branch to procedures (p2) 320 and/or (p3) 330. Procedure (p2) 320 passes control to procedure (p4) 340, which in turn, may branch to procedures (p6) 360, (p7) 370, and/or (p8) 380. Procedure (p3) 330 may branch to procedure (p5) 350, which in turn, passes control to procedure (p8) 380. Procedure (p3) 330 may alternatively branch to procedure (p7) 370. Procedure (p7) 370 passes control to procedure (p9) 390.

To improve branch prediction of the control flow illustrated in FIG. 3, the processor system 100 monitors for a procedure associated with an overflow condition. For example, a return address of the procedure may cause an overflow of the return-address stack 240. Accordingly, the processor system 100 first determines a maximum call-chain length of the procedures to determine which procedure may cause an overflow of the return-address stack 240.

Figure 4:
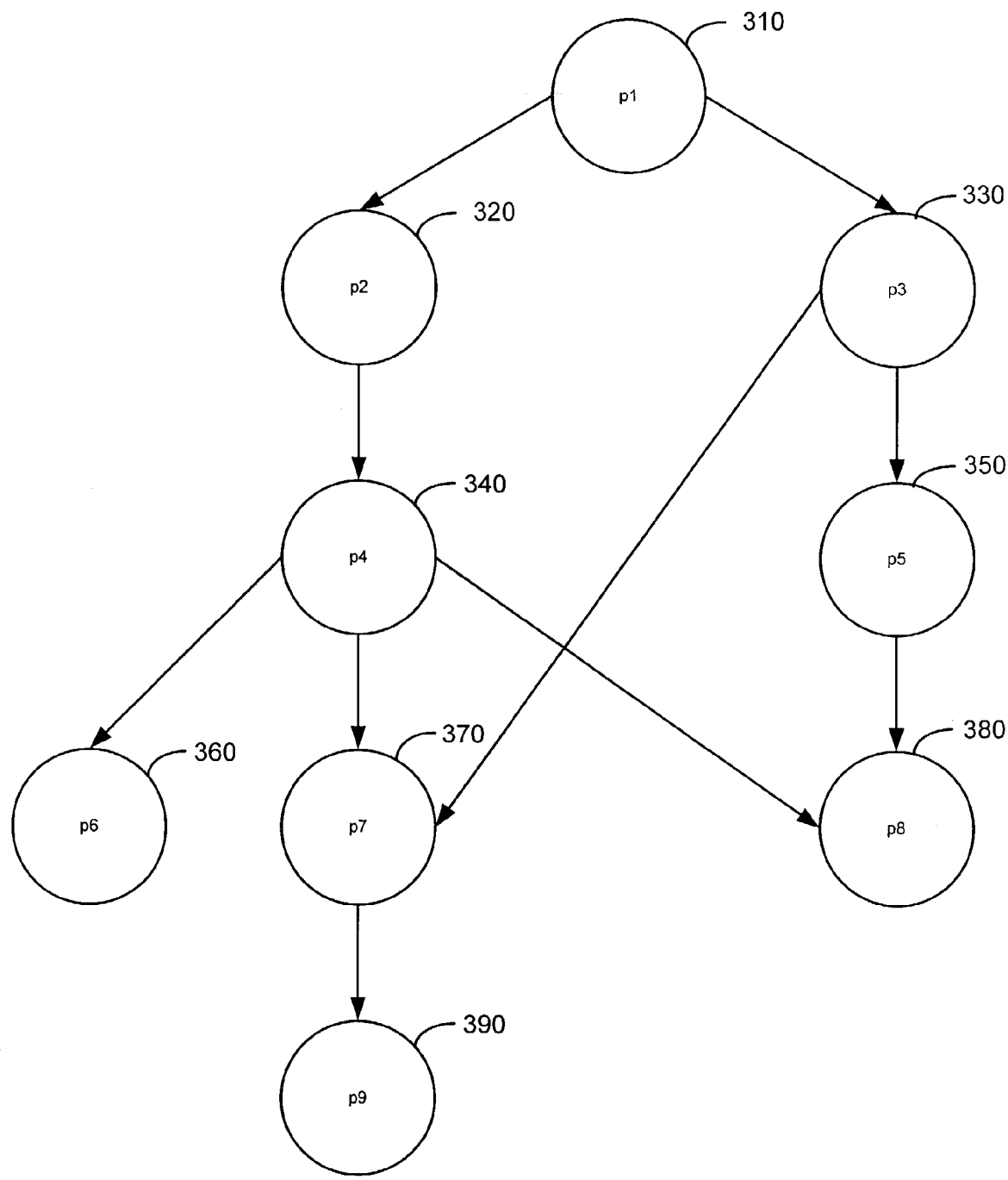
FIG. 4 is a flow diagram representation of an example call graph associated with the example control flow shown in FIG. 3.

Referring to FIG. 4, an example call graph 400 corresponding to the control flow of FIG. 3 is shown. Each of the plurality of procedures in the example call graph 400 has a maximum call-chain length. The maximum call-chain length of a procedure is based on a number of successor procedures that are called by that procedure (i.e., branches). In the illustrated call graph 400, procedure (p1) 310 has a plurality of procedure call paths with a call-chain length of three (3) (i.e., a procedure call path including procedures (p2) 320, (p4) 340, and (p6) 360; a procedure call path including procedures (p2) 320, (p4) 340, and (p8) 380; a procedure call path including procedures (p3) 330, (p5) 350, and (p8) 380; and a procedure call path including procedure call path via procedures (p3) 330, (p7) 370, and (p9) 390). Procedure (p1) 310 also has a procedure call path with a call-chain length of four (4) (i.e., a procedure call path including procedures (p2) 320, (p4) 340, (p7) 370, and (p9) 390). Accordingly, procedure (p1) 310 has a maximum call-chain length of four (4) via a procedure call path including procedures (p2) 320, (p4) 340, (p7) 370, and (p9) 390. Procedure (p2) 320 has a maximum call-chain length of three (3) (i.e., a procedure call path including procedures (p4) 340, (p7) 370, and (p9) 390). Procedure (p3) 330 has a maximum call-chain length of two (2) (i.e., either a procedure call path including procedures (p5) 350 and (p8) 380 or a procedure call path including procedures (p7) 370 and (p9) 390), and procedure (p4) 340 has a maximum call-chain length of two (2) (i.e., a procedure call path including procedures (p7) 370 and (p9) 390). Each of procedures (p5) 350 and (p7) 370 has a call-chain length of one (1). Each of procedures (p6) 360, (p8) 380, and (p9) 390 has a call-chain length of zero (0) because none of those procedures branches to other procedures.

Based on the maximum call-chain length of a procedure, the processor system 100 determines whether a procedure is associated with an overflow condition (i.e., whether a procedure causes an overflow of the return-address stack 240). To cause an overflow, the maximum call-chain length of a procedure must exceed a threshold associated with the return-address stack 240. In particular, the threshold associated with the return-address stack 240 is a number of entries (e.g., a number of return addresses) that the return-address stack 240 is configured to hold. For example, the return-address stack 240 may be configured to store two (2) entries (i.e., a threshold of two (2) return addresses). Because its maximum call-chain length is four (4), procedure (p1) 310 is associated with four (4) return addresses for the procedure calls in the call chain (i.e., a procedure call to each of procedures (p2) 320, (p4) 340, (p7) 370, and (p9) 390). Accordingly, procedure (p1) 310 pushes the four (4) return addresses into the return-address stack 240. As a result, procedure (p1) 310 causes an overflow of the return-address stack 240 because the maximum call-chain length associated with procedure (p1) 310 is greater than the threshold associated with the return-address stack 240. In a similar manner, procedure (p2) 320 causes an overflow of the return-address stack 240 because the maximum call-chain length of procedure (p2) 320 is three (3), which exceeds the threshold associated with the return-address stack 240 of two (2).

In contrast, procedures (p3) 330, (p4) 340, (p5) 350, (p6) 360, (p7) 370, (p8) 380, and (p9) 390 do not cause an overflow of the return-address stack 240 because the maximum call-chain length of each of those procedures is less than or equal to two (2). Thus, those procedures are not identified as a procedure associated with an overflow condition.

Figure 5:
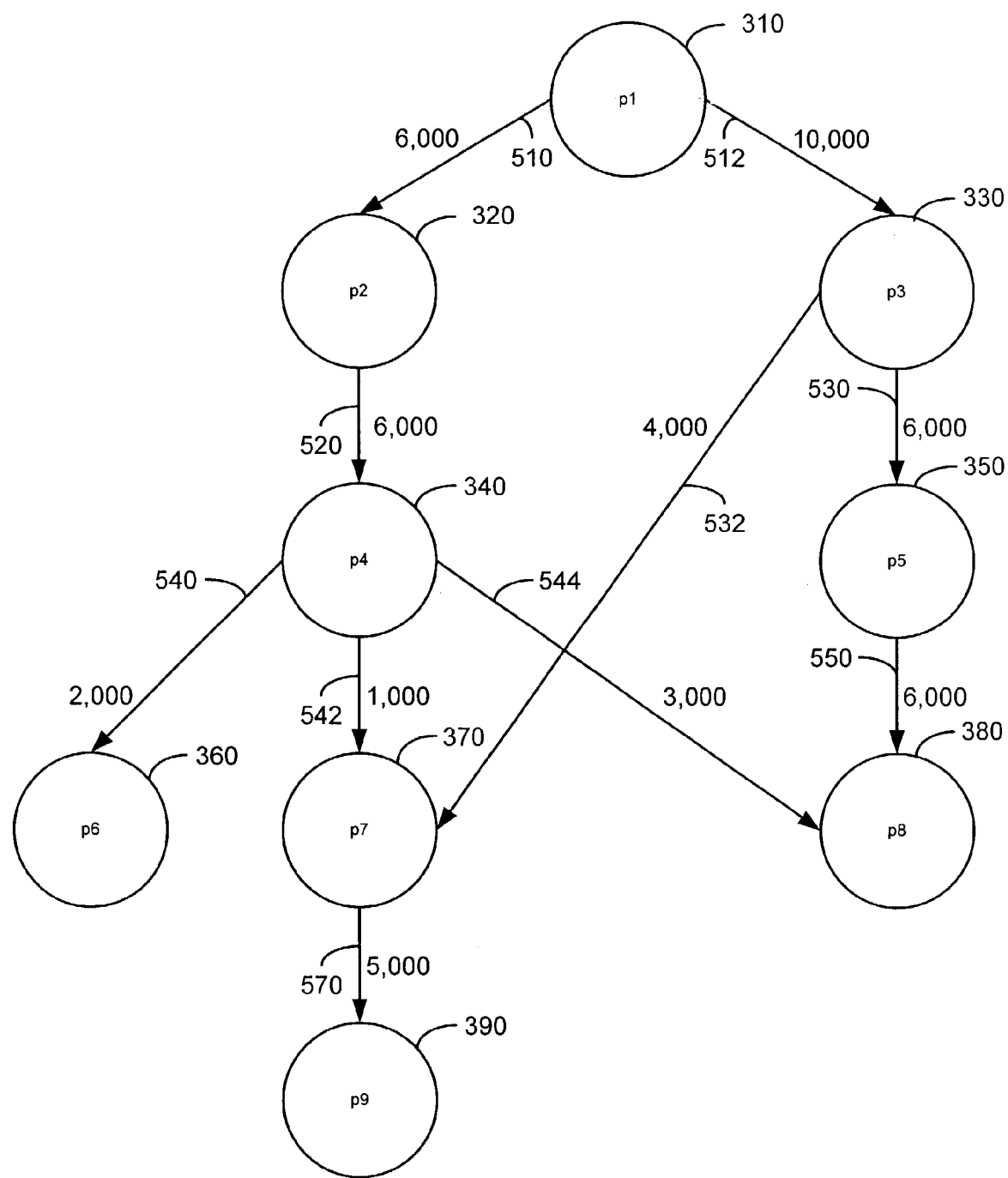
FIG. 5 is flow diagram representation of an alternative call graph associated with the example control flow shown in FIG. 3.

Alternatively, the frequency of procedure calls to a procedure (i.e., the number of times that the procedure is called by a predecessor procedure) may be monitored to further improve the accuracy of return-address prediction. Based on the frequency of procedure calls, an average call-chain length is determined for each procedure. In the example call graph 400 of FIG. 5, procedure (p2) 320 branches to procedure (p4) 340 for 6,000 times via procedure call 520. Out of the 6,000 times, procedure (p4) 340 branches to procedure (p6) 360 for 2,000 times via procedure call 540, to procedure (p7) 370 for 1,000 times via procedure call 542, and to procedure (p8) 380 for 3,000 times via procedure call 544. Accordingly, procedure (p2) 320 has a call-chain length of three (3) for 1,000 out of 6,000 times, and a call-chain length of two (2) for 5000 out of 6,000 times. Thus, the average call-chain length of procedure (p2) 320 is 2.17.

In another example, procedure (p3) 330 branches to procedure (p5) 350 and to procedure (p7) 370 for a total of 10,000 times. In particular, procedure (p3) 330 has a call-chain length of two (2) for 6,000 out of 10,000 times via procedure call 530 to procedure (p5) 350, and a call-chain length 4000 out of 10,000 times via procedure call 532 to procedure (p7) 370. As a result, the average call-chain length of procedure (p3) 330 is 2.00.

Because procedures (p5) 350 and (p7) 370 branch solely to procedures (p8) 380 and (p9) 390, respectively, the average call-chain length of procedures (p5) 350 and (p7) 370 is 1.00. Procedures (p6) 360, (p8) 380, and (p9) 390 do not branch to other procedures. Thus, the average call-chain length of those procedures is zero.

Procedure (p1) 310 branches to procedure (p2) 320 for 6,000 times and to procedure (p3) 330 for 10,000 times. In particular, procedure (p1) 310 has a call-chain length of three (3) via a number of procedure call paths: 2,000 times via a path including procedures (p2) 320, (p4) 340, and (p6) 360; 3,000 times via a path including procedures (p2) 320, (p4) 340, and (p8) 380; 6,000 times via a path including procedures (p3) 330, (p5) 350, and (p8) 380; and 4,000 times via a path including (p3) 330, (p7) 370, and (p9) 390. Procedure (p1) 310 also has a call-chain length of four (4) for 1,000 times via a path including procedures (p2) 320, (p4) 340, (p7) 370, and (p9) 390. Accordingly, procedure (p1) 310 has a call-chain length of three (3) for 15,000 times and a call-chain length of four (4) for 1,000 times out of 16,000. Thus, the average call-chain length of the procedure (p1) 310 is 3.06.

Based on the average call-chain length of a procedure, the processor system 100 determines whether a procedure may cause an overflow of the return-address stack 240. To cause an overflow of the return-address stack 240, a procedure must have an average call-chain length that exceeds the threshold associated with the return-stack address 140. Following the example described above, the return-address stack 240 may be configured to store two (2) entries (i.e., a threshold of two (2) return addresses). Accordingly, procedure (p1) 310 causes an overflow of the return-address stack 240 because the average call-chain length associated with the procedure (p1) 310 (i.e., 3.06) is greater than the threshold associated with the return-address stack 240 (i.e., 2). Similarly, procedure (p2) 320 also causes an overflow of the return-address stack 240 because the average call-chain length of procedure (p2) 320 (i.e., 2.17) exceeds the threshold associated with the return-address stack 240 (i.e., 2). Because the average call-chain length of each of procedures (p3) 330, (p4) 340, (p5) 350, (p6) 360, (p7) 370, (p8) 380, and (p9) 390 is less than or equal to two (2), those procedures may not cause an overflow of the return-address stack 240.

The processor system 100 may include a compiler (one shown as 600 in FIG. 6) configured to determine the maximum call-chain length and/or the average call-chain length as described above. The processor system 100 may also be configured to maintain a branch history to detect a procedure associated with an overflow condition. To illustrate this concept, the processor 120 is configured to monitor for branch mispredictions (i.e., an erroneous calculation of the target of a return address). Based on a history of previously-encountered branches, the processor 120 predicts the branch outcome before the branch instruction is executed. The processor 120 uses the program counter 210 to keep track of branch mispredictions and generates a branch history table (not shown) or any other suitable mapping format. The processor 120 subsequently uses the branch history table and the BTB 220 to predict the direction and target of branches.

After detecting a procedure associated with an overflow condition as described above, a branch-hint instruction is provided to determine the direction and target of a return address corresponding to the return instruction associated with the procedure. In particular, the branch-hint instruction informs the processor 120 of a target that a branch would most likely return to execute the next instruction. The branch-hint instruction may include a return address corresponding to the return instruction.

The compiler may insert the branch-hint instruction in different locations of the application. For example, the branch-hint instruction may be inserted into an entry point or a location proximate to the entry point of the procedure associated with an overflow condition. The branch-hint instruction may also be inserted into a dominant node to the procedure associated with an overflow condition. In particular, the dominant node is a predecessor procedure included in a dominant procedure call path to the procedure associated with an overflow condition (i.e., a successor procedure). To illustrate this concept, the procedure (p1) 310 shown in FIG. 4 is a dominant node to procedures (p2) 320, (p3) 330, (p4) 340, (p5) 350, (p6) 360, (p7) 370, (p8) 380, and (p9) 390. Procedure (p2) is a dominant node to procedures (p4) 340 and (p6) 360. However, procedure (p2) is not a dominant node to procedures (p7) 370 and (p8) 380 because procedure (p3) 330 also branches to procedures (p7) 370 and (p8) 380. Procedure (p4) is a dominant node to procedure (p6) 360 but not to procedures (p7) 370, (p8) 380, and (p9) 390 because procedure (p5) 350 branches to procedure (p8), and procedure (p3) 330 branches to procedures (p7) 370 and (p9) 390. Procedure (p7) 370 is a dominant node to procedure (p9) 390. Procedures (p6) 360, (p8) 380, and (p9) 390 are not dominant nodes to any procedures because none of those procedures branches to another procedure.

As noted above, the branch-hint instruction may be inserted into the dominant node of a procedure. For example, the branch-hint instruction may be inserted into procedure (p4) 340 because procedure (p4) 340 is a dominant node to procedure (p6) 360. Further, a procedure may have multiple dominant nodes (i.e., a plurality of predecessor procedures along a dominant call chain). Following the above example, procedure (p6) 360 has a dominant call chain including procedures (p1) 310, (p2) 320, and (p4) 340 as dominant nodes. In addition to inserting into procedure (p4) 340, the branch-hint instruction may be inserted into either procedure (p1) 310 or procedure (p2) 320 because procedures (p1) 310 and (p2) 320 are also dominant nodes along the dominant call chain of procedure (p6) 360.

To optimize the insertion of the branch-hint instruction, the branch-hint instruction may be inserted into a procedure itself or one of the plurality of predecessor procedures along the dominant call chain based on the instruction depth of the procedures involved. For example, the processor 120 is configured to concurrently execute a number of instructions (i.e., an instruction parallelism threshold). When the latency between the branch-hint instruction in a predecessor procedure and the return instruction in a successor procedure is less than the instruction parallelism threshold, the branch-hint instruction may be inserted into the next predecessor procedure along the dominant call chain.

To illustrate this concept, assume the processor 120 is configured to concurrently execute four (4) instructions (i.e., the instruction parallelism threshold), and procedure (p6) 360 is identified as a procedure associated with an overflow condition. As noted above, the branch-hint instruction may be inserted into an entry point of procedure (p4) 340 (i.e., the immediate predecessor procedure of procedure (p6) 360). However, if the latency between the branch-hint instruction in procedure (p4) 340 and the return instruction in procedure (p6) 360 is less than or equal to the instruction parallelism threshold of four (4), then the branch-hint instruction is not effective in procedure (p4) 340 because the processor 120 can execute the branch-hint instruction and the return instruction at the same time. The purpose of branch prediction is to determine outcome of a branch prior to executing that branch. As a result, the branch-hint instruction should be inserted into another predecessor procedures along the dominant call chain of procedure (p6) 360. That is, the branch-hint instruction is moved up the dominant call chain and inserted into, for example, procedure (p2) 320 (i.e., the next predecessor procedure after procedure (p4) 340 along the dominant call chain of procedure (p6) 360).

In the above example, if the latency between the branch-hint instruction in procedure (p2) 320 and the return instruction in procedure (p6) 360 is less than or equal to the instruction parallelism threshold of four (4), then the branch-hint instruction may not be effective. Accordingly, the branch-hint instruction may be inserted into another predecessor procedure along the dominant call chain of procedure (p6) 360. Thus, the branch-hint instruction is moved up the dominant call chain again and inserted into, for example, procedure (p1) 310 (i.e., the following predecessor procedure along the dominant call chain of procedure (p6) 360 after procedures (p4) 340 and (p2) 320).

A branch-hint instruction may also be inserted into a non-dominant node of a procedure with a critical procedure call path. A successor procedure may be called by a number of predecessor procedures via a plurality of procedure call paths. Based on the frequency of procedure calls for a procedure via the plurality of procedure call paths, the branch-hint instruction may be inserted into a predecessor procedure associated with one of the plurality of procedure call paths to the successor procedure. That is, the branch-hint instruction may be inserted into a non-dominant predecessor procedure with the greatest frequency of procedure calls to the successor procedure (i.e., the critical procedure call path). For example, procedures (p3) 330 and (p4) 340 may be non-dominant predecessor procedures of procedure (p7) 370 via procedure calls 532 and 542, respectively. The frequency of procedure call 532 is 4,000 times whereas the frequency of procedure call 542 is 1,000 times. Accordingly, the branch-hint instruction may be inserted into the procedure (p3) 330 because the frequency of procedure call 532 to procedure (p7) 370 is substantially greater than the frequency of procedure call 542 to procedure (p7) 370 (i.e., 4,000 times versus 1,000 times out of 5,000 times).

Typically, a setjmp/longjmp mechanism (i.e., a set jump function ("setjmp") and a long jump function ("longjmp")) is supported by most C/C++ compilers (e.g., Microsoft® VC++ compiler) to implement error handling and error recovery. The setjmp/longjmp mechanism provides a way to perform a "non-local goto" function. For example, if procedure f calls procedure g, which in turn calls procedure h, the setjmp/longjmp mechanism may enable the code in procedure h to jump to a pre-determined location in procedure f. A call to a set jump function in procedure f is necessary to setup a buffer that holds the stack environment at the time of the call to the set jump function. Accordingly, a long jump function may cause a transfer across all the call points to the location specified in the buffer that was setup by the set jump function down the chain of the called function.

Persons of ordinary skill in the art will readily recognize that the setjmp/longjmp mechanism may be detrimental to the performance of a return-address stack because the normal return operations are not performed. Instead, one jump instruction that transfers control to a caller without popping the required entries from the return-address stack is executed. Accordingly, the return-address stack may take a while to stabilize and to perform efficiently after a jump instruction performed by the long jump function. Further, the target of the jump instruction used by the long jump function is most likely mispredicted if the same long jump function is used to handle more than one error. That is, the target of the long jump function is dependent on the context from which it is called.

The methods and apparatus described herein may be used to improve the prediction of long jump functions. Mispredicted long jump branches as well as most frequently called targets may be monitored and identified as described above. Further, such information may be fed back to the compiler which may use either the methods described above to insert a branch hint proximate to the long jump function. As a result, erroneous predictions of return address may be reduced.

Figure 6:
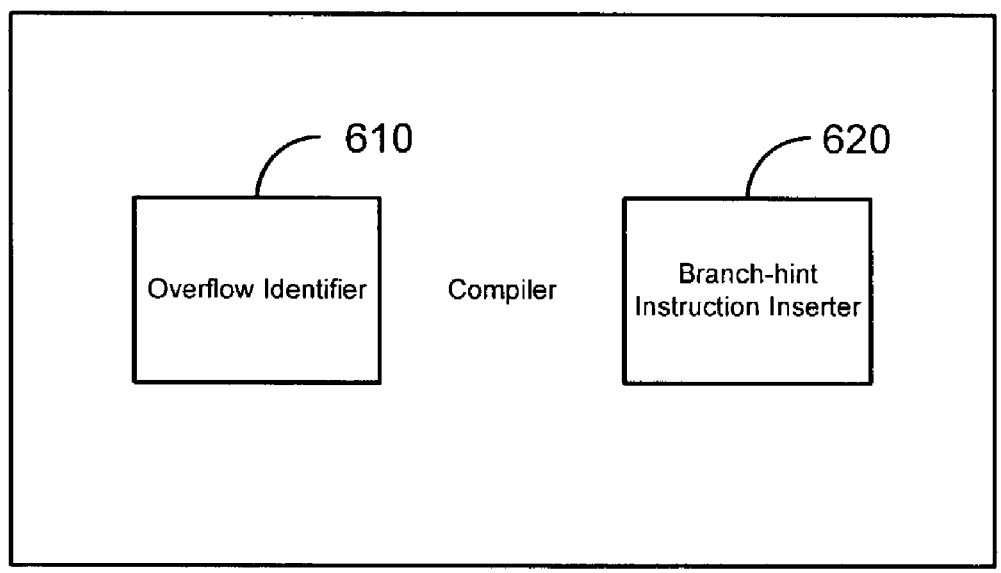
FIG. 6 is a block diagram representation of an example compiler.

The processor system 100 may include a compiler 600 to perform return-address prediction in a program. In the example of FIG. 6, the compiler 600 includes an overflow identifier 610 and a branch-hint instruction inserter 620. The overflow identifier 610 is configured to identify a procedure associated with an overflow condition and the branch-hint instruction inserter 620 is configured to insert a branch-hint instruction into the program as described above.

Figure 7:
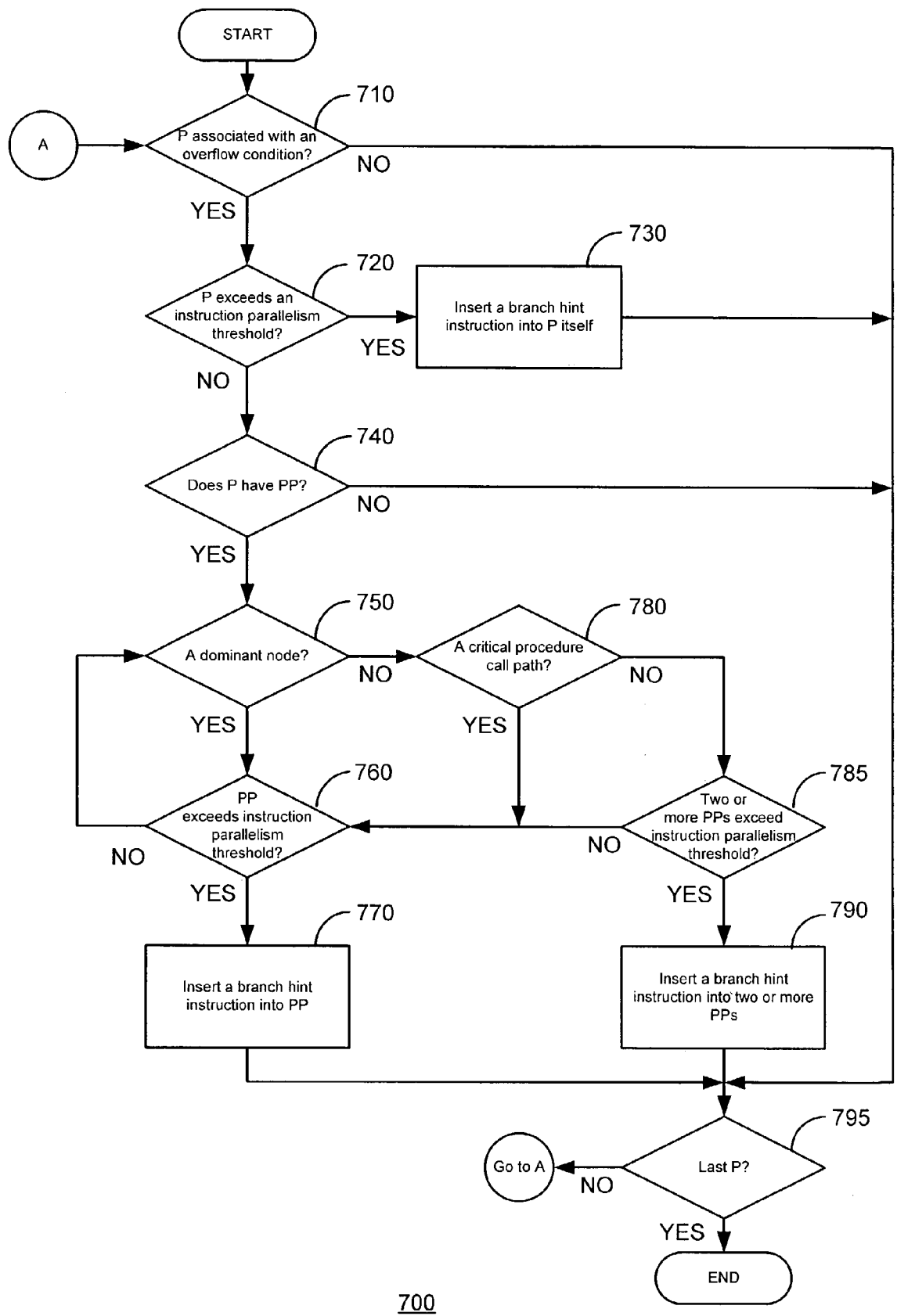
FIG. 7 is a flow diagram representation of example machine readable instructions which may be executed to perform return-address prediction.

Example machine readable instructions which may be executed by, for example, the compiler 600 of the processor system 100 are represented in a flow chart in FIG. 7. Persons of ordinary skill in the art will appreciate that the machine readable instructions can be implemented in any of many different ways utilizing any of many different programming codes stored on any of many computer-readable mediums such as a volatile or non-volatile memory or other mass storage device (e.g., a floppy disk, a compact disc (CD), and a digital versatile disc (DVD)). Further, although a particular order of instructions is illustrated in FIG. 7, persons of ordinary skill in the art will appreciate that these instructions can be performed in other temporal sequences. Again, the flow chart 700 is merely provided as an example of one way to program the compiler 600 to perform return-address prediction.

In the example of FIG. 7, the compiler 600 (e.g., via the overflow identifier 610) first determines if a procedure (P) is associated with an overflow condition as described above (block 710). For example, the compiler 600 determines a maximum call-chain length associated with the procedure (P). The compiler 600 subsequently compares the maximum call-chain length to a threshold associated with the return-address stack 240. The threshold is a number of entries that the return-address stack 240 is configured to store. If the maximum call-chain length exceeds the threshold then the procedure may cause an overflow of the return-address stack 240. Alternatively, the compiler 600 determines an averaged call-chain length associated with the procedure (P), and compares the averaged call-chain length to the threshold to determine whether the procedure (P) may cause an overflow of the return-address stack 240.

After identifying a procedure (P) associated with an overflow condition (block 710), the compiler 600 (e.g., via the branch-hint instruction inserter 620) inserts a branch-hint instruction into the application to avoid the overflow condition (i.e., a branch misprediction). In particular, the compiler 600 determines whether the depth of instructions in the procedure (P) exceeds an instruction parallelism threshold (block 720). If so, the compiler 600 inserts the branch-hint instruction into an entry point of the procedure (P) itself (block 730) and then determines whether the program includes other procedures (block 795). Controls return to block 710 (i.e., via block A), where the compiler 600 analyzes another procedure in the program. Otherwise, controls from block 730 proceed to block 740 where the compiler 600 determines whether the procedure (P) has a predecessor procedure (PP).

If a predecessor procedure (PP) is identified (block 740), the compiler 600 then determines whether the predecessor procedure (PP) is a dominant node of the procedure (P) (block 750). If the predecessor procedure (PP) is a dominant node of the procedure (P) and the depth of instructions in that predecessor procedure (PP) exceeds the instruction parallelism threshold (block 760), then the compiler 600 inserts a branch-hint instruction into an entry point of the predecessor procedure (PP) that is a dominant node of the procedure (P) (block 770) and then proceeds to block 795.

On the other hand, if the predecessor procedure (PP) is a non-dominant node of the procedure (P) then the compiler 600 determines whether the path from the predecessor procedure (PP) to the procedure (P) is a critical procedure call path (block 780). The critical procedure call path is the most frequently-called path to the procedure (P) (e.g., path 532 shown in FIG. 5). Further, if the depth of instructions in the predecessor procedure (PP) with the critical procedure call path exceeds the instruction parallelism threshold (block 760), then the compiler 600 inserts a branch-hint instruction into an entry point of that predecessor procedure (PP) that is a non-dominant node of the procedure (P) (block 770) and then proceeds to block 795.

Figure 8:
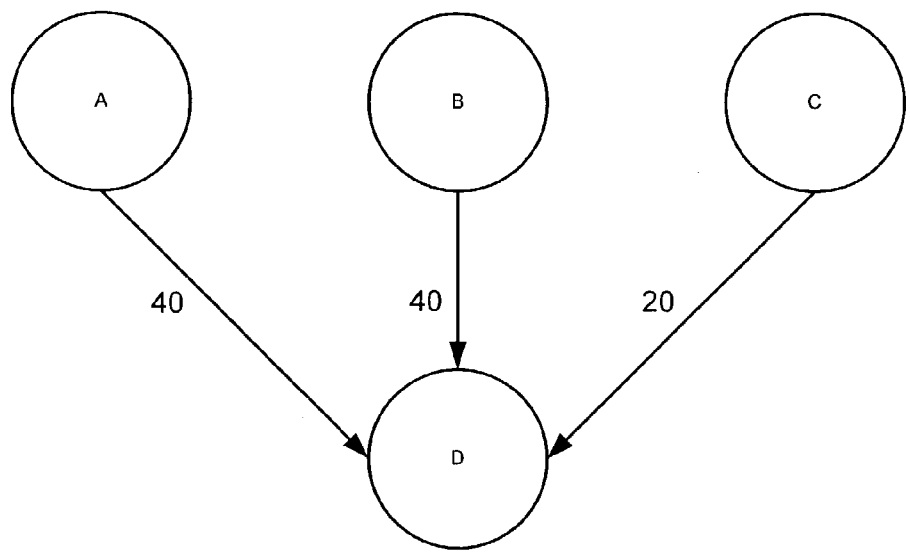
FIGS. 8 and 9 are flow diagram representations of other example call graphs.

Returning to block 770, if the predecessor procedure (PP) has a non-critical procedure call path to procedure (P) then the compiler 600 determines whether the depth of instructions in two or more predecessor procedures (PPs) exceed the instruction parallelism threshold (block 785). The frequency of procedure call paths associated with two or more predecessor procedures (PPs) may be apportioned such that none of the two or more predecessor procedures (PPs) has a majority of procedure calls. In the example call graph 800 of FIG. 8, the illustrated predecessor procedures A, B, and C branch to a successor procedure D for 40, 40, and 20, respectively, out of 100 times. Predecessor procedures A and B have a plurality of procedure calls relative to predecessor procedure C (i.e., a number of procedure calls of procedure that is greater than the number of procedure calls of other procedures but not more than half the total of procedure calls). As a result, the compiler 600 inserts a branch-hint instruction in each of the predecessor procedures (PPs) with a plurality of procedure calls (i.e., predecessor procedures A and B) (block 790) and then proceeds to block 795.

Figure 9:
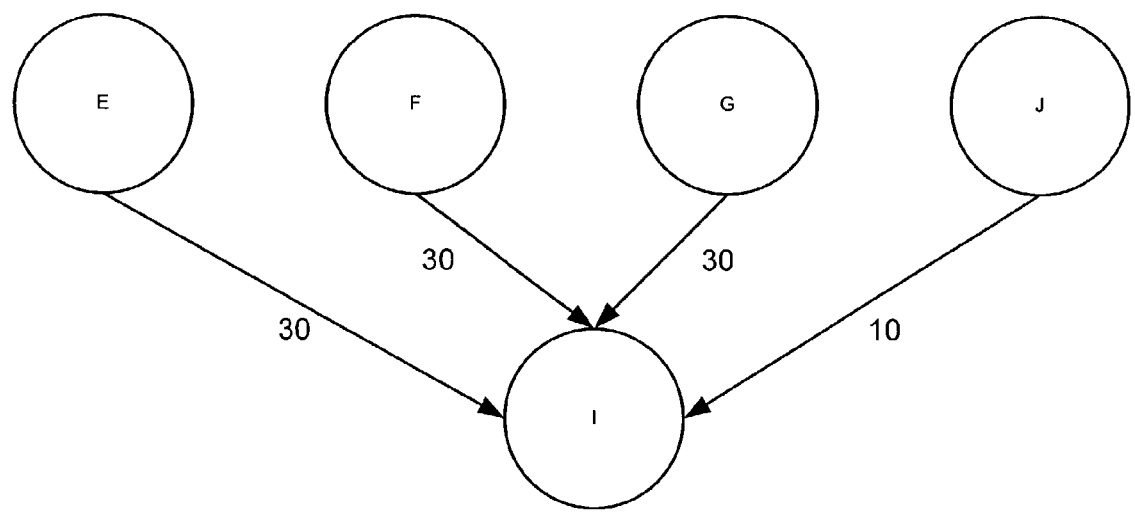

In another example call graph 900 of FIG. 9, the illustrated predecessor procedures E, F, G, and H branch to a successor procedure I for 30, 30, 30, and 10, respectively, out of 100 times. The compiler 600 may insert a branch-hint instruction into each of predecessor procedures (PPs) with a number of procedure calls to the procedure I that exceeds a procedure call threshold. To illustrate this concept, the procedure call threshold may be 20 times. Accordingly, the compiler 600 inserts a branch-hint instruction into predecessor procedures E, F, and G but not into predecessor procedure H because the frequency of procedure calls to procedure I from each of procedures E, F, and G is greater than the procedure call threshold. As a result, the branch-hint instructions may mitigate erroneous predictions of return address to improve the performance of the compiler 600.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method to perform return-address prediction in a program during a compile time, the method comprising:
detecting whether a procedure is associated with an overflow condition by determining at least one of a maximum call-chain length and an average call-chain length associated with the procedure and determining if the at least one of the maximum call-chain length and the average call-chain length exceeds a threshold associated with a return-address stack;
when the at least one of the maximum call-chain length and the average call-chain length does not exceed the threshold associated with the return-address stack, analyzing another procedure; and
when the at least one of the maximum call-chain length and the average call-chain length exceeds the threshold associated with the return-address stack, inserting a branch-hint instruction corresponding to a return instruction associated with the procedure in the program, wherein inserting the branch-hint instruction comprises inserting the branch-hint instruction in a dominant node.

2. The method of claim 1, wherein inserting the branch-hint instruction comprises inserting the branch-hint instruction in at least one of an entry point and a location proximate to the entry point of the procedure.

3. The method of claim 1, wherein the dominant node is associated with the procedure, and wherein the dominant node is an immediate predecessor procedure associated with a dominant call chain of the procedure.

4. The method of claim 1, wherein inserting the branch-hint instruction comprises inserting the branch-hint instruction in at least one of a plurality of dominant nodes associated with the procedure, and wherein the at least one of the plurality of dominant nodes is a predecessor procedure associated with a dominant call chain of the procedure.

5. The method of claim 1, wherein inserting the branch-hint instruction comprises inserting the branch-hint instruction in a predecessor procedure associated with a critical procedure call to the procedure.

6. The method of claim 1, wherein inserting the branch-hint instruction comprises inserting the branch-hint instruction in at least two of a plurality of predecessor procedures based on frequency of procedure calls to the procedure from the at least two of the plurality of predecessor procedures.

7. The method of claim 1, wherein inserting the branch-hint instruction comprises inserting the branch-hint instruction proximate to a long jump function of the procedure.

8. The method of claim 1, wherein inserting the branch-hint instruction comprises using a compiler to insert the branch-hint instruction.

9. A machine readable medium storing instructions that, when executed, cause a machine to perform return-address prediction in a program during a compile time by:
   detecting a procedure associated with an overflow condition by determining at least one of a maximum call-chain length and an average call-chain length associated with the procedure and determining if the at least one of the maximum call-chain length and the average call-chain length exceeds a threshold associated with a return-address stack;
   when the at least one of the maximum call-chain length and the average call-chain length does not exceed the threshold associated with the return-address stack, analyzing another procedure; and
   when the at least one of the maximum call-chain length and the average call-chain length exceeds the threshold associated with the return-address stack, inserting a branch-hint instruction corresponding to a return instruction associated with the procedure in the program, wherein inserting the branch-hint instruction comprises inserting the branch-hint instruction in a dominant node.

10. The machine readable medium of claim 9, wherein the instructions cause the machine to insert the branch-hint instruction by inserting the branch-hint instruction in at least one of an entry point and a location proximate to the entry point of the procedure.

11. The machine readable medium of claim 9, wherein the dominant node is associated with the procedure, and wherein the dominant node is an immediate predecessor procedure associated with a dominant call chain of the procedure.

12. The machine readable medium of claim 9, wherein the instructions cause the machine to insert the branch-hint instruction by inserting the branch-hint instruction in at least one of a plurality of dominant nodes associated with a successor procedure, and wherein the one of the plurality of dominant nodes is a predecessor procedure of the successor procedure.

13. The machine readable medium of claim 9, wherein the instructions cause the machine to insert the branch-hint instruction by inserting the branch-hint instruction in a predecessor procedure associated with a critical procedure call to the procedure.

14. The machine readable medium of claim 9, wherein the instructions cause the machine to insert the branch-hint instruction by inserting the branch-hint instruction in at least two of a plurality of predecessor procedures based on frequency of procedure calls to the procedure from the at least two of the plurality of predecessor procedures.

15. The machine readable medium of claim 9, wherein the instructions cause the machine to insert the branch-hint instruction by inserting the branch-hint instruction proximate to a long jump instruction of the procedure.

16. The machine readable medium of claim 9 comprises one of a programmable gate array, an application specific integrated circuit, an erasable programmable read only memory, a read only memory, a random access memory, a magnetic media, and an optical media.

17. The machine readable medium of claim 9, wherein the instructions cause the machine to use a compiler to insert the branch-hint instruction.

18. An apparatus to perform return-address prediction in a program during a compile time, the apparatus comprising:
   a return-address stack configured to store a number of return addresses; and
   a processor operatively coupled to the return-address stack, the processor being programmed to:
   identify a procedure associated with an overflow condition by determining at least one of a maximum call-chain length and an average call-chain length associated with the procedure and determine if the at least one of the maximum call-chain length and the average call-chain length exceeds a threshold associated with the return-address stack;
   when the at least one of the maximum call-chain length and the average call-chain length does not exceed the threshold associated with the return-address stack, analyze another procedure; and
   when the at least one of the maximum call-chain length and the average call-chain length exceeds the threshold associated with the return-address stack, insert a branch-hint instruction corresponding to a return instruction associated with the procedure in the program, wherein inserting the branch-hint instruction comprises inserting the branch-hint instruction in a dominant node.

19. The apparatus of claim 18, wherein the processor is programmed to insert the branch-hint instruction in at least one of an entry point and a location proximate to the entry point of the procedure.

20. The apparatus of claim 18, wherein the dominant node is associated with the procedure, and wherein the dominant node is an immediate predecessor procedure associated with a dominant call chain of the procedure.

21. The apparatus of claiml 18, wherein the processor is programmed to insert the branch-hint instruction in at least one of a plurality of dominant nodes associated with the procedure, and wherein the one of the plurality of dominant nodes is a predecessor procedure associated with a dominant call chain of the procedure.

22. The apparatus of claim 18, wherein the processor is programmed to insert the branch-hint instruction in a predecessor procedure associated with a critical procedure call to the procedure.

23. The apparatus of claim 18, wherein the processor is programmed to insert the branch-hint instruction in at least two of a plurality of predecessor procedures based on frequency of procedure calls to the procedure from the at least two of the plurality of predecessor procedures.

24. The apparatus of claim 18, wherein the processor is programmed to insert the branch-hint instruction proximate to a long jump function of the procedure.

25. The apparatus of claim 18, wherein the processor is programmed to use a compiler to insert the branch-hint instruction.

26. A method to identify address misprediction during a compile time, the method comprising:
identifying a return instruction having a mispredicted target, wherein the return instruction is associated with a procedure in the application, and wherein identifying the return instruction having the mispredicted target comprises identifying the return instruction having the mispredicted target based on one of a maximum call-chain length and an average call-chain length of the procedure and determining if the at least one of the maximum call-chain length and the average call-chain length exceeds a threshold associated with a return-address stack;
when the at least one of the maximum call-chain length and the average call-chain length does not exceed the threshold associated with the return-address stack, analyzing another procedure; and
when the at least one of the maximum call-chain length and the average call-chain length exceeds the threshold associated with the return-address stack, inserting a return hint corresponding to a return instruction associated with the procedure in the application, wherein inserting the return hint comprises inserting the return hint into one of a plurality of dominant nodes.

27. The method of claim 26, wherein inserting the return hint in the application comprises inserting the return hint into at least one of an entry point and a location proximate to the entry point of the procedure.

28. The method of claim 26, wherein inserting the return hint in the application comprises inserting the return hint into an immediate predecessor procedure of the procedure.

29. The method of claim 26, wherein the one of the plurality of dominant nodes is associated with the procedure, and wherein the one of the plurality of dominant nodes is a predecessor procedure associated with a call chain to the procedure.

30. The method of claim 26, wherein inserting the return hint in the application comprises inserting the return hint into a predecessor procedure associated with a critical procedure call to the procedure.

31. The method of claim 26, wherein inserting the return hint in the application comprises inserting the return hint into at least two of a plurality of predecessor procedures based on frequency of procedure calls to the procedure from the at least two of the plurality of predecessor procedures.

32. The method of claim 26, wherein inserting the return hint in the application comprises inserting the return hint into one of the plurality of procedures in the application in response to the one of the plurality of the procedures having an instruction depth exceeding an instruction parallelism threshold.

33. The method of claim 26, wherein inserting the return hint in the application comprises inserting the return hint proximate to a long jump function of one of the plurality of procedures in the application.

34. The method of claim 26, wherein inserting the return hint comprises using a compiler to insert the return hint.

35. A processor system to perform return-address prediction in a program during a compile time, the processor system comprising:
a dynamic random access memory (DRAM);
a return-address stack stored in the (DRAM) and configured to store a number of return addresses; and
a processor operatively coupled to the data structure, wherein the processor is programmed to:
identify a procedure associated with an overflow condition by determining at least one of a maximum call-chain length and an average call-chain length associated with the procedure and determining if the at least one of the maximum call-chain length and the average call-chain length exceeds a threshold associated with the return-address stack;
when the at least one of the maximum call-chain length and the average call-chain length does not exceed the threshold associated with the return-address stack, analyze another procedure; and
when the at least one of the maximum call-chain length and the average call-chain length exceeds the threshold associated with the return-address stack, insert a branch-hint instruction corresponding to a return instruction associated with the procedure in the program, wherein inserting the branch-hint instruction comprises inserting the branch-hint instruction in a dominant node.

36. The processor system of claim 35, wherein the processor is programmed to insert the branch-hint instruction in at least one of an entry point and a location proximate to the entry point of the procedure.

37. The processor system of claim 35, wherein the branch-hint instruction is associated with the procedure, and wherein the dominant node is an immediate predecessor procedure associated with a dominant call chain of the procedure.

38. The processor system of claim 35, wherein the processor is programmed to insert the branch-hint instruction in at least one of a plurality of dominant nodes associated with the procedure, and wherein the one of the plurality of dominant nodes is a predecessor procedure associated with a dominant call chain of the procedure.

39. The processor system of claim 35, wherein the processor is programmed to insert the branch-hint instruction in a predecessor procedure associated with a critical procedure call to the procedure.

40. The processor system of claim 35, wherein the processor is programmed to insert the branch-hint instruction in at least two of a plurality of predecessor procedures based on frequency of procedure calls to the procedure from the at least two of the plurality of predecessor procedures.

41. The processor system of claim 35, wherein the processor is programmed to insert the branch-hint instruction proximate to a long jump function of the procedure.

42. The processor system of claim 35, wherein the processor is programmed to use a compiler to insert the branch-hint instruction.

43. A system to perform return address prediction in a program during a compile time, the system comprising:
a processor;
an overflow identifier configured to detect a procedure associated with an overflow condition by determining at least one of a maximum call-chain length and an average call-chain length associated with the procedure and determining if the at least one of the maximum call-chain length and the average call-chain length exceeds a threshold associated with a return-address stack; and
a branch-hint instruction inserter configured to:
when the at least one of the maximum call-chain length and the average call-chain length does not exceed the threshold associated with the return-address stack, analyze another procedure; and
when the at least one of the maximum call-chain length and the average call-chain length exceeds the threshold associated with the return-address stack, insert a branch-hint instruction corresponding to a return instruction associated with the procedure into the program, wherein inserting the branch-hint instruction comprises inserting the branch-hint instruction in a dominant node.

44. The system of claim 43, wherein the branch-hint instruction inserter is configured to insert the branch-hint instruction in at least one of an entry point and a location proximate to the entry point of the procedure.

45. The system of claim 43, wherein the dominant node is associated with the procedure, and wherein the dominant node is an immediate predecessor procedure associated with a dominant call chain of the procedure.

46. The system of claim 43, wherein the branch-hint instruction inserter is configured to insert the branch-hint instruction in at least one of a plurality of dominant nodes associated with a successor procedure, and wherein the one of the plurality of dominant nodes is a predecessor procedure of the successor procedure.

47. The system of claim 43, wherein the branch-hint instruction inserter is configured to insert the branch-hint instruction in a predecessor procedure associated with a critical procedure call to the procedure.

48. The system of claim 43, wherein the branch-hint instruction inserter is configured to insert the branch-hint instruction in at least two of a plurality of predecessor procedures based on frequency of procedure calls to the procedure from the at least two of the plurality of predecessor procedures.

49. The system of claim 43, wherein the branch-hint instruction inserter is configured to insert the branch-hint instruction proximate to a long jump function of the procedure.

50. The system of claim 43, further comprising a compiler that includes the branch-hint instruction inserter.

* * * * *

UNITED STATES PATENT AND TRADEMARK OFFICE
CERTIFICATE OF CORRECTION

PATENT NO.       : 7,293,265 B2                                         Page 1 of 1
APPLICATION NO.  : 10/438608
DATED            : November 6, 2007
INVENTOR(S)      : Haghighat et al.

It is certified that error appears in the above-identified patent and that said Letters Patent is hereby corrected as shown below:

Col. 12, line 46 after "The apparatus of" and before "18" delete "claiml" and insert --claim--.

Signed and Sealed this

Eighth Day of April, 2008

JON W. DUDAS
*Director of the United States Patent and Trademark Office*